April 19, 1932.   J. E. M. CHAMBERLAINE   1,855,097
TROLLING FISH LURE
Filed March 2, 1931
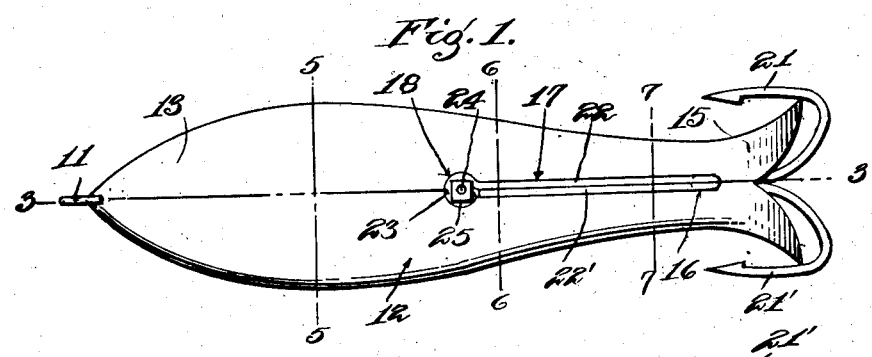
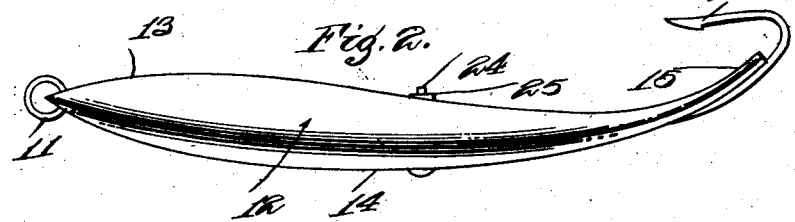
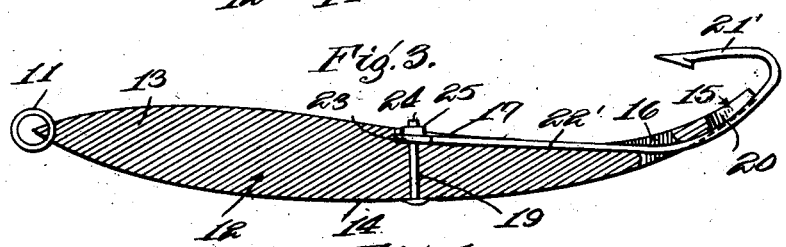
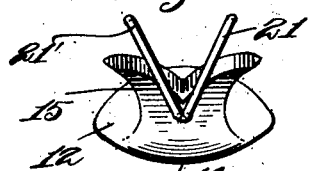
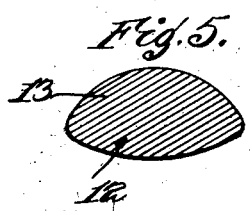
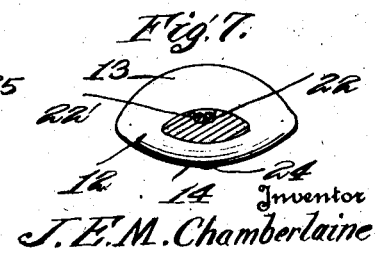
Inventor
J.E.M. Chamberlaine
By John E. Baugh
Attorney Patented Apr. 19, 1932

1,855,097

UNITED STATES PATENT OFFICE

JOSEPH E. M. CHAMBERLAINE, OF BALTIMORE, MARYLAND

TROLLING FISH LURE

Application filed March 2, 1931. Serial No. 519,546.

This invention appertains to improvements in fish lures or artificial bait and more particularly to a type thereof for the catching of fish by trolling somewhat in a manner similar to those forms of the same as are disclosed in my co-pending application filed on December 11, 1930 (Serial No. 501,649).

An object of the present invention is to provide a lure or bait of the class mentioned, wherein the hook supporting body is made to the configuration of an actual fish and of metal, preferably solid when used in deep water trolling and whereby it may have the required weight to carry it to a selected depth of water without resorting to the attachment of separate weighting devices or sinkers thereto.

Another object of the invention resides in the body, while having the true form of an actual fish, is also shaped to a somewhat vertical irregular curvature in its longitudinal extent in order that it will travel through the water with the lateral darting movements of, for instance, a frightened live fish, thereby accentuating the alluring qualities thereof.

A further object of the invention is to provide a bait or lure of fish form to simulate an actual fish when trolled through a body of water, wherein the caudal fin or tail portion of the body is upwardly curved in a manner to effect a natural rising and dipping motion during its travel in addition to the lateral darting movements aforesaid, the curvature of the caudal fin or tail portion also having the added function of effectively concealing a major portion of the hook structure and otherwise protecting the same to an appreciable extent against injury.

With the foregoing and other equally important objects and advantages in view, the invention resides in the certain new and useful combination, construction and arrangement of parts as will be hereinafter more fully described, set forth in the appended claims, and illustrated in the accompanying drawings in which:

Figure 1 is a top plan view of the practical embodiment of the device, Figure 2 is a side elevation, Figure 3 is a vertical longitudinal section, taken on the line 3—3 of Figure 1, Figure 4 is a rear end elevation, Figure 5 is a vertical longitudinal section taken on the line 5—5 of Figure 1,

Figure 6 is a similar view but taken on the line 6—6 of Figure 1, and

Figure 7 is another similar view but taken on the line 7—7 of Figure 1.

Referring to the drawings, wherein like characters of reference designate corresponding parts in the several views thereof, the embodiment of the invention, as shown therein by way of example only, is constituted in a body 12 which has the general configuration of a fish and is preferably made from metal, either solid or hollow, the metal employed being non-unstable in character, such as aluminum or its alloys. The body 12 is to be made in different sizes and weights and is of solid construction, particularly when employed for deep water fishing, in order to avoid the common practice of attaching additional weight, usually in the form of one or more lead sinkers, thereto which seriously interfere with the desired natural fish-like motion of the bait or lure and otherwise lowers the effectiveness of its alluring qualities.

As shown, the body 12 has a trolling line attaching member or ring 11 loosely supported in the nose of the head portion 13 thereof, which portion, when the body is in a postion of use, is upwardly and forwardly inclined to impart a slight rising motion to the latter during its travel through the water when being trolled. The forward end portion of the body (as shown) is, however, of greater weight than the rear end portion thereof, in order to resist too great a rising motion under the angle of pull of a trolling line. As a consequence of this, the travel of the lure is substantially horizontal through the water at all times, but such travel will be accompanied by a slight rising and dipping motion, as well as the lateral darting motion aforesaid. The lower surface of the upwardly inclined head portion of the body 12 merges in a rearward direction into a somewhat flattened surface of comparatively small area, as at 14, which is situated at the approximate transverse center of the body or slightly forward of such center. From the flattened surface portion 14, the lower surface of the body 12 merges into an upwardly and rearwardly curving portion, which, in turn, continues into the lower surface of the caudal fin or tail portion 15 rising sharply upward and having the tips of the fin disposed substantially in the plane of the highest point of curvature of the forwardly disposed head portion of the body.

The upper side of the body curves rearwardly from the highest point of curvature of the head portion thereof in a downward and rearward direction from a point somewhat forwardly of the front end of the flattened portion 14 at the lower side of the body and reaches the lowest point of its downward trend well beyond the plane of the rearwardly directed end of the said flattened portion 14 and in the approximate plane of the transverse center of the rear half portion of the body, from whence it curves sharply upward for mergence into the upper surface of the caudal fin or tail portion 15. The approximate rear half portion of the body 12 tapers rearwardly in curved lines, in both horizontal and vertical directions, after the manner of the similar body portion of an actual fish, to its point of connection with the flared caudal fin or tail portion 15, the tips of the latter having a spread substantially equal to the greatest width of the body 12.

An opening 16 is formed vertically through the body 12 in the plane of the approximate center of the narrowest portion thereof and a grove 17 is formed in the upper body surface and leads forwardly from the upper end of the opening 16 to a point substantially in the plane of the transverse center of the body, where it opens into a depression or countersink 18. A vertical bore 19 opens into the depression 18 at its upper end, while a second grove 20 is formed in the under side of the caudal fin or tail portion 15 rearwardly from the lower end of the opening 16 and in line with the groove 17, both of which grooves are disposed in the plane of the longitudinal center of the body 12.

By this arrangement, a hook 21 is to be mounted in place on the body 12 by first having the eye end 23 of its shank 22 inserted upwardly through the opening 16 and thereafter brought to rest with the shank portion 22 in the grooves 17 and 20 and the eye portion 23 in the drepression 18, when the hook 21 will curve upwardly of and from the groove and thence forwardly of and in spaced overlying relation to the caudal fin or tail portion 15 of the body.

In the present instance, a double hook structure is contemplated and, as shown, the same may be made up of two standard hooks wherein the eye end of the shank 22' of the second hook 21' will be severed and the straight length of the shank brought into juxtaposition to the corresponding shank portion 22 of the hook 21, with its free severed end abutted against the eye 23 of the latter, substantially as is shown in Figure 1. In this position of the hook shanks 22 and 22', the same may be joined together, as by a welding or other process. Here, the two hooks 21 and 21' will preferably be spread apart to oppositely and upwardly angled or inclined positions, so that, when in place on the body 12, the free end portions of the hooks will extend forwardly in overlying relation with respect to the tips of the oppositely flared portions of the caudal fin or tail portion 15 (Figures 1 and 4), the point of mergence of the joined shanks 22 and 22' from the groove 20 at the under side of the latter portion of the body 12 being at the point of divergence of the rearwardly directed edges of the said fin portions.

With the hook structure in operative position on the body 12, the opening in the eye 23 will be engaged over the end of a bolt 24 which is passed upwardly through the vertical bore 19 in the body 12 for the purpose, and thereafter secured in place by a nut 25. In order to permit of the placing of the hook structure in position, the opening 16 must be elongated in a longitudinal direction relatively to the body 12 and to an extent to provide a length thereto slightly greater than the diameter of the eye 23. Also, the hook structure must be turned sidewise from its normal position of use to permit of the insertion of the eye 23 upwardly of the opening 16 and thereafter turned back to proper position by disposing the hooks 21 and 21' in an upward direction.

However, if a single hook only is to be employed, the opening 16 need not be of elongated form but only of a size large enough to permit of the passage of the free end of the hook to be passed downwardly therethrough from an inverted position, when the shank and eye portions thereof will lower into the groove 17 and the depression 18 as the hook portion is moved rearwardly beneath the caudal fin or tail portion 15 by an end for end turning movement of the entire hook structure. Thus, as the eye 23 and the shank 22 engage respectively in the depression 18 and the groove 17, the rear end portion of the shank will engage in the groove 20 at the lower side of the caudal fin or tail portion 15 and the free end portion of the hook take proper position in a forwardly directed and overlying relation with respect to the latter. In this instance, however, the hooked end portion of the hook structure will be preferably disposed in line with the longitudinal center of the body 12, rather than in angular relation to one side or the other thereof.

In the actual use of a lure or bait, as thus constructed and arranged, it has been demonstrated that the same, when in motion at the free end of a trolling line, will have a lateral darting motion, from one side to the other of its forward direction of travel during trolling, to an average distance of three feet, while at the same time, it will also have a rising and dipping motion of appreciable extent, all of which motion closely follows that of an actual fish swimming in the water when ravenous or frightened.

It is to be noted that the surfaces of the body will, of course, be highly polished in order to reflect by flashes the rays of light reaching the same when in motion, so that its natural alluring qualities are greatly enhanced thereby.

Without further description, it is thought that the features and advantages of the invention will be readily apparent to those skilled in the art, and it will of course be understood that changes in form, proportion and minor details of construction may be resorted to, without departing from the spirit of the invention or its scope as claimed.

I claim:

1. In a fish lure of the class described, an elongated, solid metal body having its two sides convexed, line attaching means at the forward end of said body, and a hook carried at the rear end of said body, the selected weight of said body acting to determine the depth of effective operation of the lure in a body of water.

2. A lure as set forth in claim 1, wherein the pointed end of the hook overlies the rear end of said body in forwardly projecting relation thereto and the shank portion of the hook is attached to the body in a manner that it is shielded thereby substantially throughout its length.

3. A lure as set forth in claim 1, wherein the forward end portion of said body is of greater weight than the other end thereof, in order to cause a dipping and rising motion of the lure under the pulling action of a trolling line connected to said attaching means.

4. In a fish lure of the class described, an elongated, solid metal body having its upper and lower sides convexed, line attaching means at the forward end of said body, a caudal fin formation at the rear end of said body, and a hook projecting rearwardly from the latter end of said body and upturned substantially from between the oppositely diverging portions of said fin formation, the selected weight of said body acting to determine the depth of effective operation of the lure in a body of water.

5. A lure as set forth in claim 4, wherein the said caudal fin formation is upwardly angled to conform substantially to the bend of the connected portion of the hooked end of the shank and in a manner to act as a guard therefor.

6. A lure as set forth in claim 4, wherein said body is in the form of a fish turned sidewise and has the caudal fin formation at its rear end curving upwardly and rearwardly therefrom, with a central opening formed upwardly through the connected portion of the same, and the hook has its shank portion passing forwardly through the said opening from beneath said caudal fin formation for the securement of its attaching eye to the upper side of the body.

In testimony whereof I affix my signature.

JOSEPH E. M. CHAMBERLAINE.